Nov. 24, 1964 W. F. BARTLETT 3,158,812
IMPULSE ANALYZER FOR TIME DIVISION
MULTIPLEX SWITCHING SYSTEMS
Filed March 30, 1961 3 Sheets-Sheet 1

INVENTOR.
WILLIAM F. BARTLETT
BY
Robert L. Nathans
ATTORNEY

Nov. 24, 1964 W. F. BARTLETT 3,158,812

IMPULSE ANALYZER FOR TIME DIVISION MULTIPLEX SWITCHING SYSTEMS

Filed March 30, 1961 3 Sheets-Sheet 3

United States Patent Office 3,158,812 Patented Nov. 24, 1964

3,158,812

IMPULSE ANALYZER FOR TIME DIVISION MULTIPLEX SWITCHING SYSTEMS

William F. Bartlett, Rochester, N.Y., assignor to General Dynamics Corporation, Rochester, N.Y., a corporation of Delaware Filed Mar. 30, 1961, Ser. No. 99,400
8 Claims. (Cl. 328—42)

The present invention relates to impulse analyzers utilized in time division multiplex switching systems.

In high speed time division multiplex switching systems, a plurality of line circuits, each of which is associated with a telephone subset or with a data handling device, are coupled to a common transmission highway through line gates. Where a first line circuit is to be coupled to a second line circuit through a common transmission highway, a repetitive pulse or time slot is assigned to the connection, the time slot being utilized to simultaneously actuate the line gates associated with the line circuits so that each line circuit is simultaneously coupled to a common transmission highway once during each repetitive transmission frame. This sampling process results in the transmission of intelligence between the connected line circuits. Where the time division multiplex switching system is a telephone exchange, a subscriber associated with the first line circuit transmits intelligence to an impulse analyzer, which intelligence may be representative of on-hook, off-hook, and directive information. This information is analyzed and utilized for control purposes. Prior art analyzers of this type have been relatively complicated and expensive.

Accordingly, it is a principal object of the present invention to provide a new and improved impulse analyzer for high speed time division multiplex electronic switching systems.

It is a further object of the present invention to provide an improved impulse analyzer which utilizes a minimum number of components, thereby to sharply reduce the cost of the analyzer.

It is yet a further object of the present invention to provide a new and improved impulse analyzer for detecting various types of off-hook conditions, such as interdigit periods, periods between dial impulses of a particular digit, on-hook periods, such as dial impulses, and final on-hook, and also for forwarding control signals to common control circuitry indicative of these various conditions.

It is a feature of the present invention to provide an impulse analyzer comprising a single two-stage binary counter together with logic circuitry operating in conjunction with three different clock pulse sources for performing all necessary impulse recognition functions while utilizing a minimum number of components.

Further objects, features, and advantages of the invention will become apparent as the following description proceeds, and the features of novelty which characterize the invention will be pointed out with particularity in the claims annexed to and forming a part of this specification.

Figure 1:
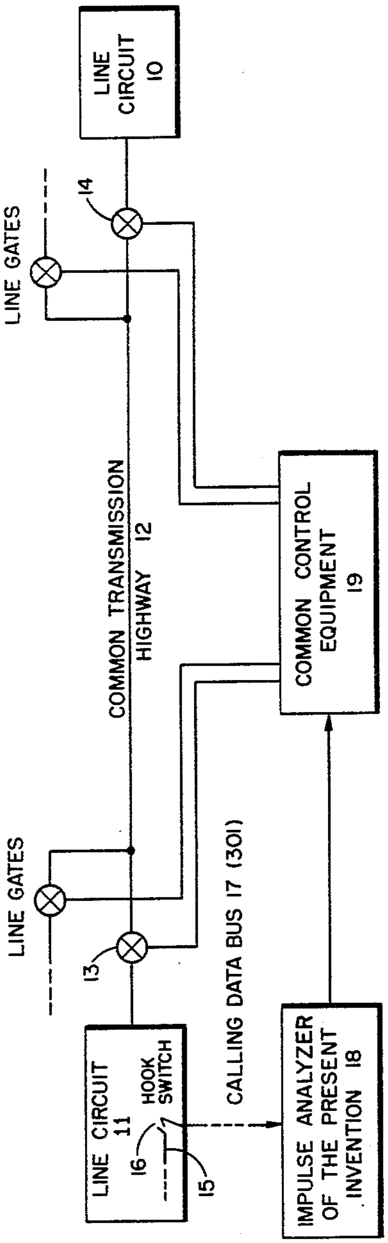
Figure 2:
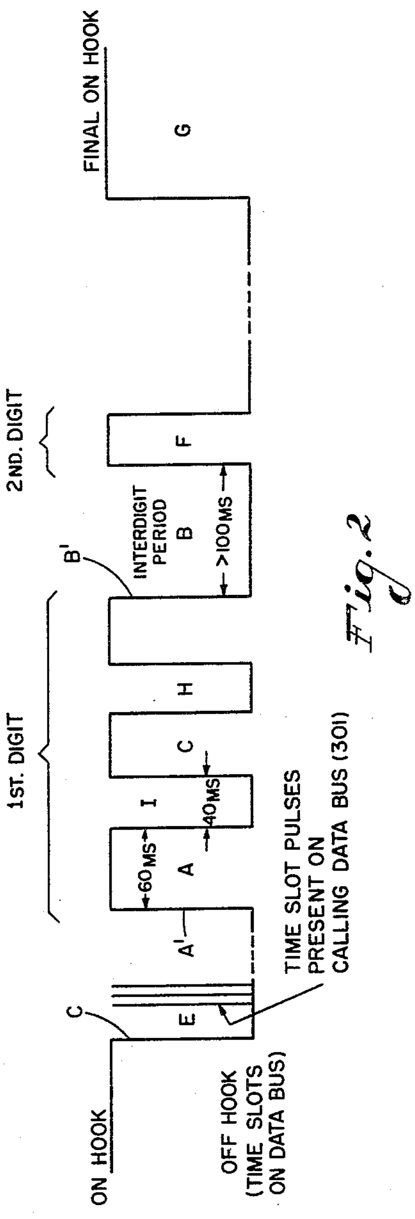
Figure 3A:
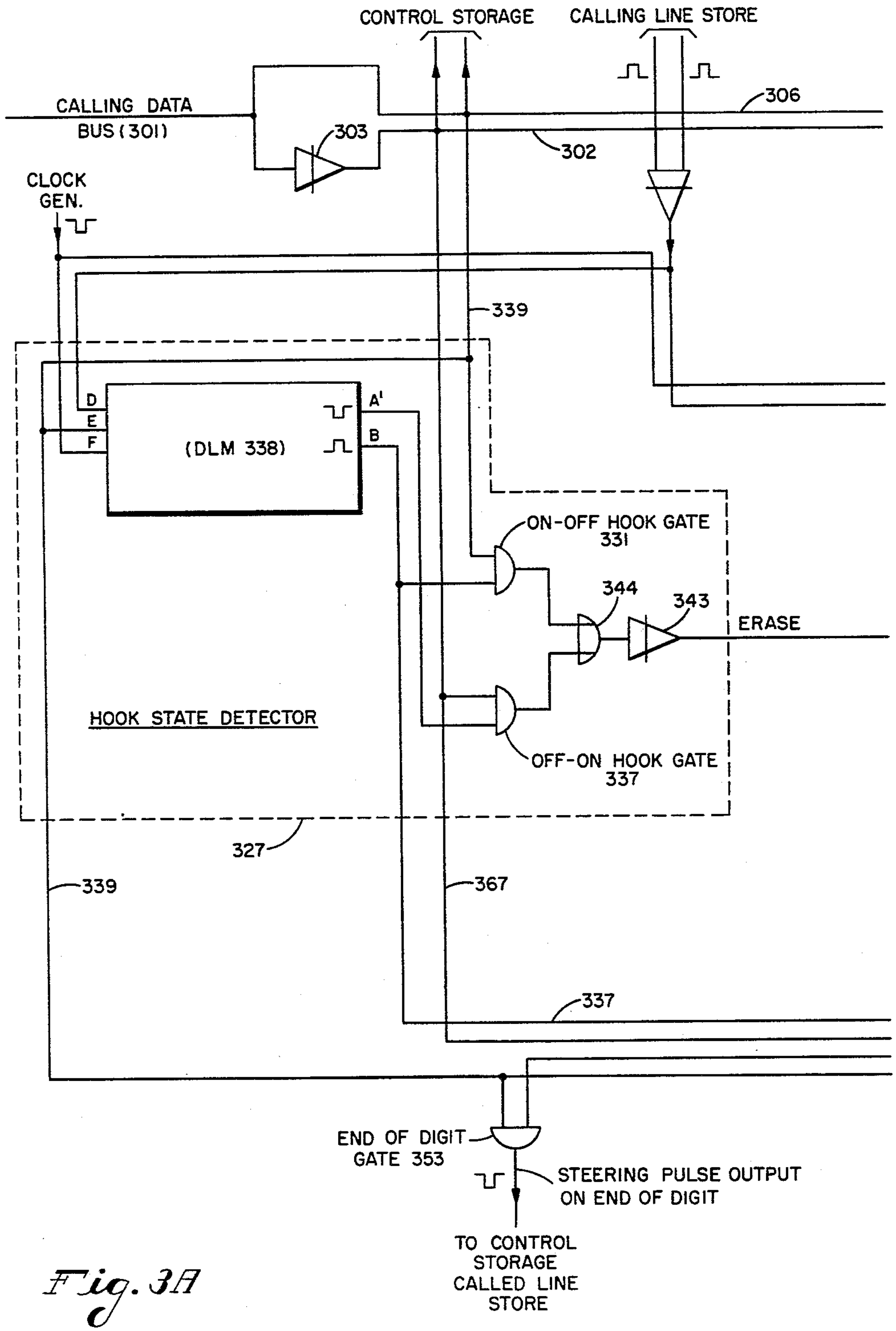
Figure 3B:
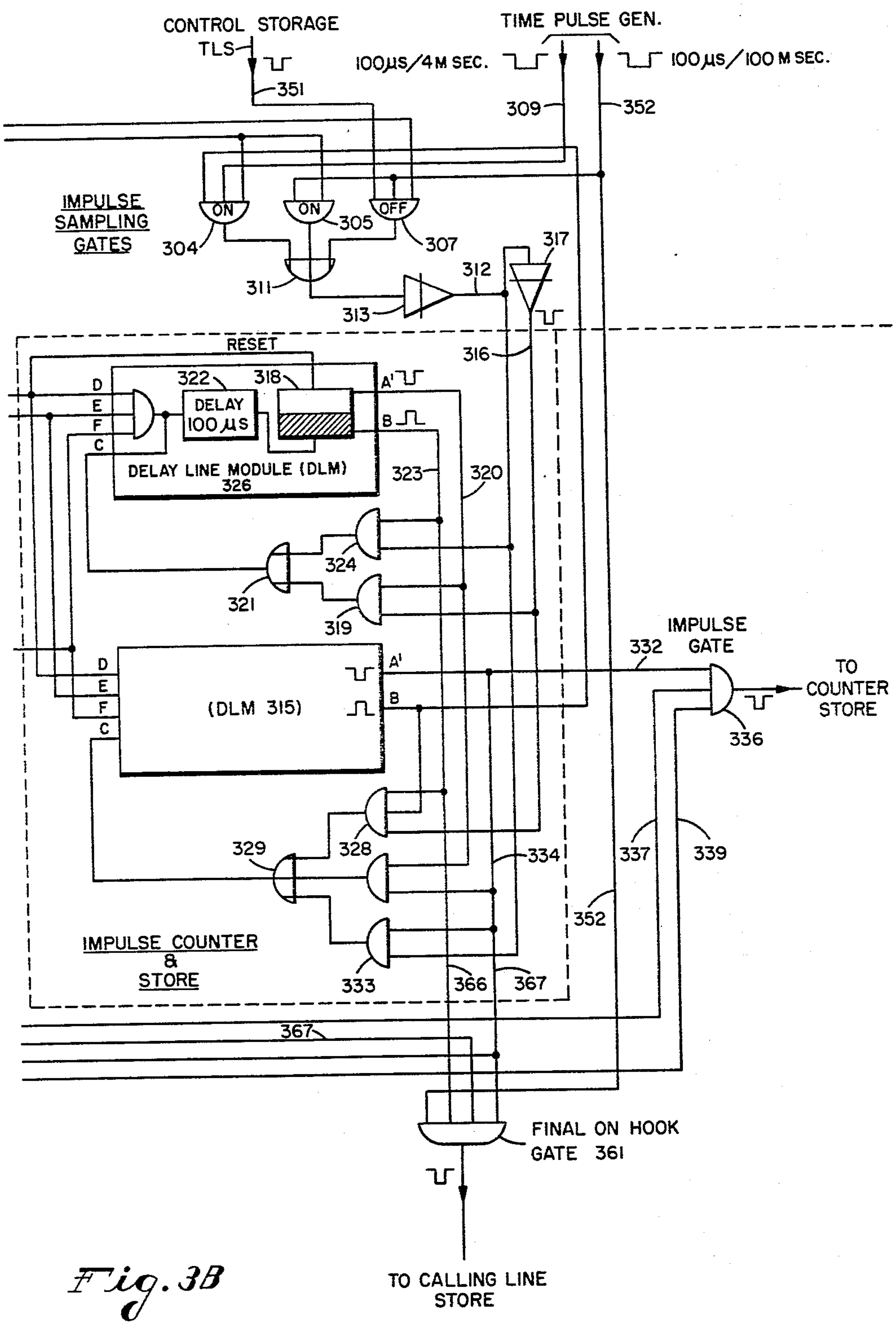

For a better understanding of the invention, reference may be had to the accompanying drawings in which:

FIG. 1 discloses a general schematic diagram of the environment of the impulse analyzer of the present invention;

FIG. 2 discloses a pulse chart which is helpful in understanding the operation of the disclosed embodiment of the present invention; and FIGS. 3A and 3B disclose a schematic of the preferred embodiment of the present invention.

Referring now to FIG. 1, one of a large number of line circuits 11 is disclosed coupled to a common transmission highway 12 through a line gate 13. Line circuit 10 is also disclosed coupled to a common transmission highway 12 through line gate 14. It should be understood that a large number of line circuits are coupled to common transmission highway 12 in a time division multiplex switching system, which line circuits are not disclosed in FIG. 1. The impulse analyzer of the present invention may readily be utilized in the electronic switching system disclosed in application Serial No. 45,342 of Barrie Brightman, filed July 26, 1960 and assigned to the same assignee as the present invention. The impulse analyzer disposed in the aforementioned application could be removed and the impulse analyzer of the present invention could be readily substituted. Of course, the impulse analyzer of the present invention could be utilized in time division multiplex switching systems, or other systems, other than that disclosed in the aforementioned copending application. In that system, each line circuit is sequentially scanned to determine whether or not service is being requested by a subscriber or machine associated with each individual line circuit. Let us assume that a telephone subscriber associated with line circuit 11 desires to place a call. In this case, he would lift the handset from the cradle, thus establishing an off-hook condition. Since all of the line circuits are sequentially scanned at high speeds for the purpose of detecting a request for service, in a few moments a time slot or impulse occurring once during each transmission frame would be applied to conductor 15 of line circuit 11. The off-hook condition of the hookswitch would result in contacts 16 being closed so that a time slot pulse train would be applied to calling data bus 17, which is coupled to impulse analyzer 18 of the present invention. The subscriber subset coupled to line circuit 11 is capable of transmitting numerical pulse type directive information to the impulse analyzer. This mechanism forms no part of the present invention but will produce impulses, as disclosed in FIG. 2, of the numerical pulse type. The dial impulses, which will have a pulse width of sixty milliseconds, are produced by causing hookswitch 16 to break, thereby to remove the time slot train from calling data bus 17. The hookswitch together with the calling data bus may be considered a data source whose output is to be analyzed. After the first impulse, represented by A in FIG. 2, an intradigit pause having a period of forty milliseconds is created by the reclosure of hookswitch 16, to reapply the time slot train to calling data bus 17. Assuming the first digit is the number "3," the process is repeated until all impulses have been received. An interdigit period, represented by B in FIG. 2, which must be greater than one hundred milliseconds, occurs before the second digit is transmitted.

Impulse analyzer 18 operating in conjunction with common control equipment 19 after receiving the first digit causes the digit to be inserted into a recirculating delay line memory store in binary form in common control equipment 19. When the impulse analyzer recognizes period B, shown in FIG. 2, as an interdigit period B rather than an intradigit period, such as period H, a steering circuit within common control equipment 19 is actuated so that the second digit, represented by impulse F in FIG. 2, does not affect the store which contains the first digit but steers digit F into a lower order counter store. These digits are stored in a time slot within the recirculating counter stores of common control equipment 19 in the same time slot as that assigned to line circuit 11. After all digits have been analyzed by impulse analyzer 18 and have been stored in the appropriate recirculating delay line, counter store gates are actuated so that the entire binary coded decimal number causes a particular cross-point in a terminating line matrix to be enabled.

If the called party's line circuit is not busy, the time slot assigned to the calling party's line circuit 11 will be transmitted through the aforementioned matrix cross-point and to line gate 14, disclosed in FIG. 1, thereby to complete the connection between line circuit 11 and line circuit 10. The aforementioned common control equipment forms no part of the present invention. An example of the type of common control equipment which may be controlled by impulse analyzer 18 is disclosed in the aforementioned copending application of Barrie Brightman.

The preferred embodiment of the impulse analyzer of the present invention will analyze the first impulse A of FIG. 2. This impulse must have a pulse width of at least four milliseconds in order for the impulse analyzer to register a dial impulse. If the pulse width should be less than four milliseconds, this means that the impulse is spurious and may be attributed to contact bounce, for instance. If the impulse is greater than eight milliseconds and less than one hundred and four milliseconds, an impulse will be transmitted to the counter store. The impulse analyzer must analyze intradigit period I. If this period is less than one hundred milliseconds, it is not registered as an interdigit period so that the aforementioned steering circuitry is not actuated. This process is repeated until the impulse analyzer perceives that period B is greater than one hundred milliseconds and, accordingly, transmits an end of digit signal to the common control equipment, thereby to cause the aforementioned steering circuitry to be stepped. The process is repeated with further digits.

After the conversation between line circuits 10 and 11 is completed, line circuit 10 or 11 will assume an on-hook condition. The condition will be a final on-hook condition and it is important that the impulse analyzer recognize period G of FIG. 2 as such a condition, thereby to clear the common control equipment rather than to reoperate the binary counter of the analyzer. It should also be noted that the dial impulses must be distinguished from the final on-hook condition. The analyzer is designed to recognize final on-hook at times if the on-hook condition is greater than one hundred and eight milliseconds, but, in any case, at all times where the on-hook condition is greater than two hundred and four milliseconds. Where the on-hook condition is less than one hundred and eight milliseconds, this condition will be recognized as a dial impulse providing the on-hook interval is greater than four milliseconds.

*Dial Impulse Recognition*

Referring now to FIGS. 3A and 3B of the drawings, when a calling subscriber removes his handset from the cradle of the subset, a time slot is assigned to the line circuit associated with the calling party, thereby to cause a time slot impulse to be impressed upon calling data bus 301 once every one hundred microsecond frame period. The dialing mechanism within the subscriber's subset is constructed so that on-hook dial impulses are sixty milliseconds wide, as shown in FIG. 2, and off-hook intradigit periods between these dial impulses are forty milliseconds wide. The forty millisecond period applies only to intervals between dial impulses which comprise a particular digit, the interdigit period, shown in FIG. 2, being greater than one hundred milliseconds. The first dial impulse, designated A in FIG. 2, causes the aforementioned time slot pulses produced on calling data bus 301 to be removed. As a result, a negative voltage is impressed upon conductor 302 by virtue of the operation of inverter 303 and, consequently, AND gates 304 and 305 become partially enabled. At this time, ground potential is impressed upon conductor 306 so that AND gate 307 is disenabled. Dial impulse A, in order to be recognized as a dial impulse, must be at least four milliseconds wide so as to eliminate a false registration of an impulse produced by contact bounce. A one hundred microsecond enabling impulse is applied to gate 304 over conductor 309 every four milliseconds. This impulse passes through AND gate 304, OR gate 311, and causes a no mark condition to be produced on conductor 312 due to the presence of inverter 313. It should be noted that AND gate 304 is fully enabled by the presence of a mark produced on lead 314 due to the fact that delay line module 315 does not contain a time slot. The no mark condition produced on conductor 312 produces a mark on conductor 316 due to inverter 317. Flip-flop 318 at this time partially enables AND gate 319 over lead 320 and, consequently, the aforementioned mark passes through AND gate 319, OR gate 321, and into delay line 322. When the mark emerges from delay line 322, flip-flop 318 is actuated, thereby to produce a mark on conductor 323 which passes through now enabled AND gate 324 and through OR gate 321 to be reapplied to delay line 322. The flip-flop is reset by the trailing edge of the clock pulse. The impulse or bit continues to recirculate through the delay line module via AND gate 324 and OR gate 321. Since the mark on lead 309 is no longer present during the first few recirculating cycles, conductor 316 again becomes unmarked so that AND gate 319 is disenabled. Accordingly, it is seen that AND gate 319 initially causes the time slot to be introduced in the delay line module and is thereafter disenabled while AND gate 324 becomes enabled, thereby to provide for the recirculation of the time slot impulse.

Four milliseconds after the four millisecond impulse (one hundred milliseconds wide) was applied to conductor 309, a second impulse produced on conductor 309 will be introduced into the input circuit of inverter 313. This will only occur if the on-hook condition persists. Should the on-hook condition no longer persist because the leading edge of impulse A of FIG. 2 was merely part of a spurious signal, AND gate 304 will no longer be enabled so that a mark is not applied to inverter 313, thereby to affect the counter which comprises delay line modules 326, 315 and its associated logic circuitry, disclosed in FIG. 3B. The trailing edge of such a spurious signal causes detector 327 to erase the time slot circulating in delay line module 326. If the on-hook condition persists, the second impulse applied to conductor 309 will cause an impulse to be produced on conductor 316 as before, thereby to pass through AND gate 328, which is enabled at this time, and OR gate 329 and into delay line module 315, which is identical to delay line module 326 disclosed in FIG. 3B. AND gate 328 is enabled at this time because delay line module 315 does not contain a time slot or bit and, accordingly, its monostable multivibrator, similar to multivibrator 318, marks input lead 331 of AND gate 328. At this time, a time slot will be present on lead 323 since a time slot is stored in module 326 and, accordingly, AND gate 328 introduces the time slot into delay line module 315. When a time slot introduced into delay line module 315 operates its multivibrator, a mark is applied to AND gate 333 over conductor 334. Since a mark condition is present on conductor 312 at this time, AND gate 333 causes the time slot or bit to be recirculated through delay line module 315 in like manner as AND gate 324, whose operation was previously described.

While the aforementioned time slot is being introduced into delay line module 315 through fully enabled AND gate 328, it should be noted that recirculation gate 324 becomes disenabled due to the no mark condition present on conductor 312 and, accordingly, the time slot previously circulating in delay line module 326 is erased.

In summary, the first impulse applied to conductor 309 will cause a time slot to be introduced into delay line module 326, which time slot continues to recirculate in delay line module 326 until a second impulse is produced on conductor 309. This second impulse causes the recirculating time slot in delay line module 326 to be erased and causes a time slot to be introduced into delay line module 315, which continues to recirculate through the delay line module 315 after the cessation of the second impulse applied to conductor 309.

It should be apparent that after a minimum on-hook period of four milliseconds, a mark may be present on conductor 332 due to the presence of a time slot in delay line module 315. It is possible that just after the occurrence of the leading edge A' of dial impulse A, disclosed in FIG. 2, an impulse is applied to conductor 309. Since this impulse will be repeated in four milliseconds, thereby to cause a time slot to be introduced into delay line module 315, as explained hereinabove, it follows that the interval between these two impulses will be at least four milliseconds.

As a result of the introduction of a time slot into delay line module 315, impulse gate 336 becomes partially enabled by virtue of the mark condition on lead 332. In any case, an eight millisecond on-hook period will cause impulse gate 336 to be partially enabled.

If the first dial impulse A, disclosed in FIG. 2, persists for at least four milliseconds, thereby to cause impulse gate 336 to become partially enabled, a mark condition will be present on lead 337 since no time slot is contained within delay line module 338 owing to the fact that time slots are not present on calling data bus 301 during the on-hook period. This mark further enables impulse gate 336. Just after the occurrence of the trailing edge of first dial impulse A, of FIG. 2, a time slot pulse will be produced on calling data bus 301 which in turn produces a mark on lead 339, which mark passes through enabled impulse gate 336 and is forwarded to the aforementioned counter store which forms no part of the present invention. The second time slot which is applied to calling data bus 301 will not be passed through impulse gate 336 thereby to give a spurious count since the first time slot is emerging from delay line module 338, thereby to cause a no mark condition to be produced on conductor 337, which in turn disenables impulse gate 336. The on-hook to off-hook condition, which is represented by the trailing edge of the first dial impulse A of FIG. 2, causes a no mark condition to be produced in the output circuit of detector 327 which disenables the AND gates contained within each delay line module of the counter, thereby to erase the recirculating time slots and reset the counter. This erase condition is produced in the output circuit of detector 327 upon the occurrence of either the leading or trailing edges of the impulses shown in FIG. 2 so that detector 327 may be described as a change of hook state detector. Since the impulse counter comprising delay line module 326 and delay line module 315 is utilized to measure the digit impulse, final on-hook, and the interdigit period represented by B of FIG. 2, it is necessary that the counter be reset upon the occurrence of all leading and trailing edges of the pulse train of FIG. 2.

The hook-state detector 327 operates as follows. Upon the occurrence of the original off-hook condition represented by C of FIG. 2, a time slot is produced upon calling data bus 301, thereby to partially enable on-off gate 341 by virtue of conductor 342. Since this is the first time slot of a train of time slots to be impressed on calling data bus 301, a mark condition is present on output terminal B of delay line module 338 which causes a mark to be introduced into the input circuit of inverter 343 through OR gate 344. Consequently, the no mark erase condition, mentioned hereinabove, is produced on the input terminals F' of the delay line modules of the impulse counter. The second time slot will not cause this erase condition because the first time slot will be emerging from delay line module 338 to disenable AND gate 341. During the interval when on-off hook gate 341 is enabled, off-on gate 347 is disenabled due to the action of inverter 303.

Just after the occurrence of leading edge A' of impulse A, which represents a change from the off-hook to the on-hook condition, it follows that a time slot will be produced in the output circuit of delay line module 328 but that no time slot will be produced on calling data bus 301 so that conductor 342 at this time will not be marked so that on-off gate 341 is disenabled. However, due to the action of inverter 303, off-on gate 347 becomes partially enabled so that the time slot produced on the output terminal A of delay line module 338 will pass through off-on gate 347 and OR gate 344, thereby to produce the aforementioned no mark erase condition in the output circuit of hook detector 327.

In summary, a no mark erase condition is produced in the output circuit of hook detector 327 upon each change of state of the hookswitch, which is manifested by either a cessation of the pulse train produced on calling data bus 301 or the generation of this train. Since the leading edge of the second digit impulse C, disclosed in FIG. 2, causes the counter to be reset, the aforementioned counting process is repeated so that an impulse is produced in the output circuit of impulse gate 336 in the event that impulse C has a minimum width of eight milliseconds.

*Interdigit Period Recognition*

Let us assume that the first digit is "3." In this case, the three impulses disclosed in FIG. 2 will be counted by the aforementioned counter store having its input circuit coupled to the output circuit of impulse gate 336. If the second digit is "1," the impulse analyzer of the present invention must distinguish between interdigit periods, such as B shown in FIG. 2, and the forty millisecond period between impulses. In the absence of such a determination, the dial impulses of FIG. 2 would cause the digit "4" to be registered in the counter rather than the digits "3" and "1." In order for the period B of FIG. 2 to be recognized by the impulse analyzer as an interdigit period, this period must be at least one hundred milliseconds in duration. Upon the occurrence of the trailing edge B', shown in FIG. 2, impulse sampling gates 304 and 305 are disenabled due to the action of inverter 303. The negative-going time slots, however, are impressed upon conductor 306 but are unable to pass through disenabled impulse sampling gates 304 and 305. Sampling gate 307 is, however, partially enabled by a mark produced on conductor 351 having the same time position in each transmission frame as the time slots present on conductor 306. This mark is produced by control storage circuitry, not shown, but described in the aforementioned copending application where some directive information is contained within the terminating line storage circuitry. Accordingly, at the beginning of period B, shown in FIG. 2, conductor 351 will be marked since the first digit has been applied to the control storage circuitry. On the other hand, during the initial off-hook period, labeled E in FIG. 2, no information would be stored in the control storage circuitry since no directive information has been transmitted. As a result, during the period labeled E, FIG. 2, conductor 351 would be unmarked to disenable AND gate 307. An impulse having a pulse width of one hundred microseconds is applied to AND gate 307 via conductor 352 every one hundred milliseconds. During the period labeled B of FIG. 2, this impulse will pass through fully enabled AND gate 307 to cause a time slot to be inserted in delay line module 326, as previously explained. If the period labeled B is in fact an interdigit period, a second one hundred millisecond pulse will be passed through AND gate 307 so as to insert a time slot in delay line module 315, as previously explained. One hundred microseconds later the A' output terminal of delay line module 315 will be marked, thereby partially enabling end of digit gate 353 over conductor 367. Since a time slot train is applied to the calling data bus during this period, a time slot impressed upon conductor 339 will pass through the enabled end of digit gate 353 to actuate the steering circuitry mentioned hereinabove. Since two one hundred millisecond impulses are required to pass through AND gate 307 to enabled end of digit gate 353, it follows that period B must be greater than one hundred milliseconds if the end of digit gate 353 is to produce an output signal. Should period B be less than one hundred milliseconds, the leading edge of the succeeding pulse would operate hook-state detector 327 to reset the counter, as previously explained, thereby to prevent the actuation of end of digit gate 353.

*Final On-Hook*

The impulse analyzer of the present invention must also be able to differentiate between a digit impulse, such as A, C, or F disclosed in FIG. 2, and a final on-hook condition, represented by G in FIG. 2. If the on-hook condition is greater than one hundred and eight milliseconds, a final on-hook condition may be detected but, in any case, if the final on-hook condition is greater than two hundred and four milliseconds, a final on-hook condition will be detected. The impulse analyzer produces a mark in the output circuit of final on-hook gate 361 where the final on-hook condition is detected. This signal is forwarded to the calling and terminating line stores, thereby to erase the time slot assigned to the call from these storage devices, and the call is accordingly released. At the beginning of the final on-hook period, the leading edge of impulse G of FIG. 2 causes the counter to be reset, as previously explained. Since the time slot train is not present on calling data bus 301 at this time, impulse sampling gate 307 is disenabled while AND gates 304 and 305 are enabled owing to inverter 303. Accordingly, a four millisecond mark is produced on conductor 314 since module 315 is empty, to further enable AND gate 304 so that the four millisecond impulses present on conductor 309 will pass through AND gate 304, thereby to insert a time slot into delay line module 326, as previously explained. The second four millisecond impulse will cause a time slot to be inserted into delay line module 315 and will cause the time slot recirculating in delay line module 326 to be erased. As a result, a no mark condition is produced on conductor 314, thereby to disenable AND gate 304. The first one hundred millisecond impulse present on conductor 352 will pass through AND gate 305 and will cause a time slot to be inserted into delay line module 326. One hundred microseconds later the mark is present on conductors 366 and 367, thereby to partially enable final on-hook gate 361. Owing to the absence of time slot impulses on calling data bus 301 and to the action of inverter 303, a mark is produced on conductor 367 which further enables final on-hook gate 361. However, at this time, the aforementioned one hundred millisecond impulse is no longer present on conductor 352 although this impulse was present one hundred microseconds previously. It therefore follows that a further one hundred millisecond period must pass before an impulse will be produced in the output circuit of the final on-hook 361. Such a mark could be produced one hundred and eight milliseconds after the occurrence of the leading edge of impulse G of FIG. 2. This could happen in the unlikely event that the second four millisecond impulse passed by AND gate 304 occurs just before the first one hundred millisecond impulse that is able to pass through AND gate 305. An impulse will be produced in any case in the output circuit of final on-hook gate 361 after the occurrence of two hundred and four milliseconds because, in the worst case, the second four millisecond impulse to be passed by AND gate 304 would be coincident with the first one hundred millisecond impulse passed by AND gate 305. In this case, the coincident second four millisecond impulse and the first one hundred millisecond impulse would merely register the second count so that a second and third one hundred millisecond impulse would be necessary to count to four which is, of course, the required count to operate final on-hook gate 361. Should on-hook interval G be spurious and have a width of, say, fifty milliseconds, the on-to off-hook condition would be detected by hook detector

327 and the impulse counter would be reset, as previously explained, to prevent the count of four to be registered.

It should be understood that the present invention is not restricted to the particular arrangement disclosed in FIGS. 3A and 3B. In fact, an infinite number of arrangements are possible. For instance, let it be assumed that an output signal is to be generated when a sixty millisecond pulse is applied to the analyzer. This pulse will, of course, enable a gate which feeds the driving pulse train to the input circuit of the counter. Together with the last mentioned output signal, let it be assumed that a second output signal is to be generated if the pulse applied to the analyzer is greater than six-hundred milliseconds. Let it also be assumed that a four millisecond pulse train is utilized for driving the counter. An AND gate may be provided having four input terminals, each coupled to an output terminal of the first four stages of the binary counter. Accordingly, upon a count of sixteen, an output signal is produced by the AND gate, thereby to indicate at least a sixty millisecond interval. The output signal produced by the AND gate may be utilized to operate steering circuitry similar to AND gates 304, 305 and 307 of FIG. 3B. Accordingly, a one hundred millisecond pulse train, for instance, is now applied to the counter. A second AND gate is coupled to subsequent stages of the counter, thereby to generate an output signal six-hundred milliseconds later, which output signal is produced when the count of six is added to the prior count of sixteen. Of course, the tolerance involved here would be plus or minus one hundred milliseconds whereas the tolerance involved where only the four millisecond pulse train is applied would be plus or minus four milliseconds. If it is desired, further stages may be added to the counter and a third clock pulse source may have its output circuit steered to the input circuit of the counter to measure longer intervals.

While there has been disclosed what is at present considered to be the preferred embodiment of the invention, other modifications will readily occur to those skilled in the art. It is not, therefore, desired that the invention be limited to the specific arrangement shown and described and it is intended in the appended claims to cover all such modifications as fall within the true spirit and scope of the invention.

What is claimed is:

1. In combination, a binary counter having a first and second stage, a first clock pulse source, a second clock pulse source for producing a lower frequency pulse train than the pulse train produced by said first clock pulse source, a data source for producing a first or second condition, means responsive to said first condition for applying the pulses produced by said first clock pulse source to said binary counter, and means responsive to the storage of a bit in said second stage for preventing the application of the pulse train produced by said first clock pulse to said binary counter and for causing the pulse train produced by said second clock pulse source to be applied to said binary counter.

2. The combination as set forth in claim 1 further including means coupled to said data source and responsive to the storage of a bit in both said first stage and said second stage for producing a first control signal, provided that said first condition is maintained during the counting process.

3. The combination as set forth in claim 1 wherein means coupled to said data source are included for producing a control signal when a bit is stored in said second stage, provided that a change occurs from said first condition to said second condition during the operation of said binary counter.

4. The combination as set forth in claim 2 wherein means coupled to said data source are included for producing a second control signal when a bit is stored in said second stage, provided that a change occurs between said first condition and said second condition during the operation of said binary counter.

5. In combination, a binary counter having a first and second stage, a first clock pulse source, a second clock pulse source for producing a lower frequency pulse train than the pulse train produced by said first clock pulse source, a data source for producing a first or second condition, means responsive to said first condition for applying the pulses produced by said first clock pulse source to said binary counter, means responsive to the storage of a bit in said second stage for preventing the application of a pulse train produced by said first clock pulse source to said binary counter and for causing the pulse train produced by said second clock pulse source to be applied to said binary counter, means responsive to said second condition for applying the pulses produced by said second clock pulse source to said binary counter while causing said counter to be reset, and means coupled to said data source for producing an output signal in response to the storage of a bit in said second stage provided that said second condition is maintained during the operation of said binary counter.

6. A circuit for indicating the commencement and cessation of a pulse train on a data bus comprising, a delay line having an input circuit coupled to said data bus, a first and second AND gate each having a first and second input terminal, means for coupling the first input terminal of said first AND gate to the output circuit of said delay line, an inverter having an input and output circuit, means for coupling the input circuit of said inverter to said data bus, means for coupling the output circuit of said inverter to the second input terminal of said first AND gate, means for coupling the first input terminal of said second AND gate to said data bus, and means for inverting the output of said delay line and applying it to the second terminal of said second AND gate.

7. In combination, a binary counter having a first and second stage, a first clock pulse source, a second clock pulse source for producing a lower frequency pulse train than the pulse train produced by said first clock pulse source, a data source producing a first or second condition, means responsive to said first condition for applying the pulses produced by said first clock pulse source to said binary counter, means responsive to the storage of a bit in said second stage for preventing the application of the pulse train produced by said first clock pulse source to said binary counter and for causing the pulse train produced by said second clock pulse source to be applied to said binary counter, and means responsive to the storage of a bit in said first and second stages for producing an output signal unless said data source produces said second condition during the counting process and for a fixed period thereafter.

8. In combination, a binary counter having a plurality of stages, a first clock pulse source, a second clock pulse source for producing a lower frequency pulse train than the pulse train produced by said first clock pulse source, a data source for producing a first or second condition, means responsive to said first condition for applying the pulses produced by said first clock pulse source to said binary counter, means responsive to the storage of a bit in certain of the stages of said counter for preventing the application of the pulse train produced by said first clock pulse source to said binary counter and for causing the pulse train produced by said second clock pulse source to be applied to said binary counter, and means responsive to the storage of bits in certain of the stages of said binary counter for producing an output signal, provided that said first condition is maintained during the counting process.

References Cited in the file of this patent

UNITED STATES PATENTS

| | | |
|---|---|---|
| 2,656,106 | Stabler | Oct. 20, 1953 |
| 2,867,724 | Olson | Jan. 6, 1959 |
| 2,892,933 | Shaw | June 30, 1959 |
| 2,978,174 | Dean et al. | Apr. 4, 1961 |